United States Patent
Wang et al.

(10) Patent No.: US 9,201,182 B2
(45) Date of Patent: Dec. 1, 2015

(54) DISPLAY PANEL AND COLOR FILTER THEREOF

(71) Applicant: AU OPTRONICS CORP., HsinChu (TW)

(72) Inventors: Ying-Li Wang, HsinChu (TW); Kuei-Bai Chen, HsinChu (TW); Chen-Hsien Liao, HsinChu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 263 days.

(21) Appl. No.: 13/837,339

(22) Filed: Mar. 15, 2013

(65) Prior Publication Data
US 2014/0009848 A1  Jan. 9, 2014

(30) Foreign Application Priority Data
Jul. 4, 2012 (TW) .............................. 101124052 A

(51) Int. Cl.
*G02B 5/22* (2006.01)
*G02B 7/00* (2006.01)
*G02B 5/20* (2006.01)

(52) U.S. Cl.
CPC *G02B 5/22* (2013.01); *G02B 5/201* (2013.01); *G02B 2207/113* (2013.01)

(58) Field of Classification Search
None
See application file for complete search history.

(56) References Cited

U.S. PATENT DOCUMENTS

| 2,439,181 | A | * | 4/1948 | Nicoll ....................... F21K 2/00 250/458.1 |
| 4,470,666 | A | | 9/1984 | Eick |
| 4,793,692 | A | | 12/1988 | Kamio et al. |
| 6,295,106 | B1 | * | 9/2001 | Fukuzawa et al. .............. 349/71 |
| 6,826,001 | B2 | * | 11/2004 | Funakura et al. .............. 359/885 |
| 7,777,838 | B2 | * | 8/2010 | Lee et al. ...................... 349/106 |
| 2012/0069277 | A1 | | 3/2012 | Wang et al. |
| 2013/0128548 | A1 | | 5/2013 | Lin |

FOREIGN PATENT DOCUMENTS

| CN | 102436092 A | 5/2012 |
| TW | 201213961 A | 4/2012 |

OTHER PUBLICATIONS

China Patent Office, "Office Action", Feb. 8, 2014.

\* cited by examiner

*Primary Examiner* — Jade R Chwasz
(74) *Attorney, Agent, or Firm* — WPAT, PC; Justin King

(57) ABSTRACT

A display panel including an active device array substrate, a color filter and a display medium layer is provided. The color filter is disposed above the active device array substrate and includes a substrate and a yellowish photoresist. The yellowish photoresist is disposed between the substrate and the active device array substrate. The yellowish photoresist includes a first fluorescent material, and the optical transmittance in the optical transmitted spectrum of the yellowish photoresist corresponding to the wavelength between 600 nm and 800 nm is greater than 1. The display medium layer is disposed between the active device array substrate and the color filter.

18 Claims, 6 Drawing Sheets

US 9,201,182 B2

DISPLAY PANEL AND COLOR FILTER THEREOF

TECHNICAL FIELD

The disclosure relates to a display panel, and more particularly to a display panel including a color filter.

BACKGROUND

A liquid crystal display apparatus has advantages including high definition, high contrast ratio, wide viewing angle and high color saturation. It has become a major application of current display technology. A typical color liquid crystal display apparatus includes a color filter, an active device array substrate and a liquid crystal layer disposed therebetween. The color filter splits light passed therethrough into several light components each having different colors. The light components can be mixed to output or directly output for achieving color displaying on the display apparatus. However, the color filter decreases brightness of images displayed on the display apparatus. Therefore, a major subject in the technology field is to improve the color saturation and the light transmittance of the color filter.

SUMMARY

Therefore, the disclosure provides a color filter for improving the color saturation and brightness of the images displayed on a display panel using the color filter.

The disclosure further provides a display panel, capable of displaying images with high color saturation and high brightness.

The disclosure provides a color filter includes a substrate and a yellowish photoresist. The yellowish photoresist is disposed on the substrate and includes a first fluorescent material. The optical transmittance in the optical transmitted spectrum of the yellowish photoresist corresponding to the wavelength between about 600 nm and about 800 nm is substantially greater than 1.

The disclosure provides a display panel including an active device array substrate, the above mentioned color filter and a display medium layer. The color filter is disposed on the active device array substrate. The display medium layer is disposed between the active device array substrate and the color filter.

The color filter adopts yellowish photoresist including fluorescent material for absorbing light of longer wavelength band, so that the optical transmittance in the optical transmitted spectrum of the yellowish photoresist corresponding to the wavelength between about 600 nm and about 800 nm is substantially greater than 1. Consequently, not only the color gamut of the display panel using the color filter is expanded, but the color saturation and the brightness of the images displayed on the display panel are improved as well.

BRIEF DESCRIPTION OF THE DRAWINGS

The disclosure will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
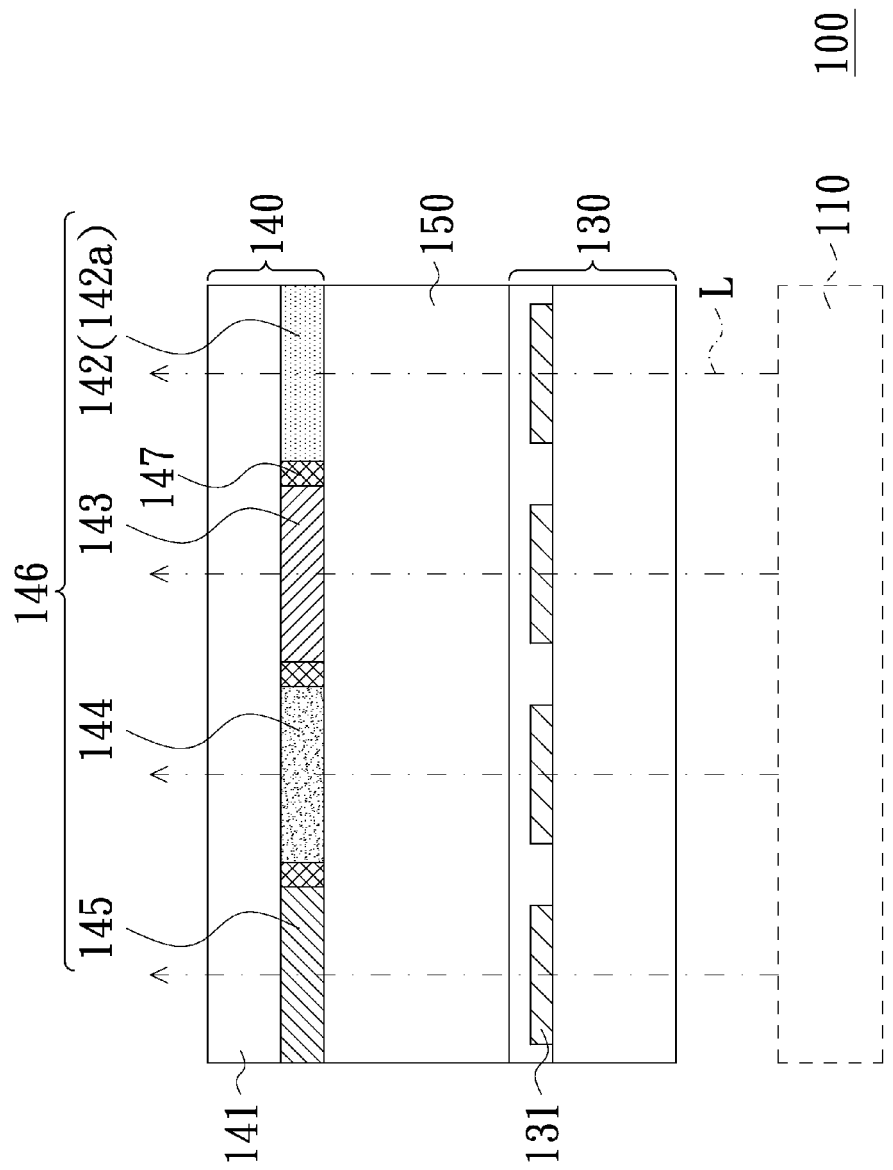
FIG. 1 is a cross sectional view of a display panel according to an embodiment of the disclosure.

FIG. 1 is a cross sectional view of a display panel according to an embodiment of the disclosure. Referring to FIG. 1, the display panel 100 includes an active device array substrate 130, a color filter 140 and a display medium layer 150. The display medium 150 is disposed between the active device array substrate 130 and the color filter 140. The active device array substrate 130 includes a plurality of driving elements 131 (only four of them are shown in FIG. 1 for illustration). The driving elements 131 includes, for example, thin film transistors (TFTs), pixel electrodes, scan lines and data lines (not shown). Wherein gate electrode of the TFT electrically connected to the corresponding scan line, source electrode of the TFT electrically connected to the corresponding data line, and the drain electrode of the TFT electrically connected to the corresponding pixel electrode. The display medium layer 150 is, for example, a liquid crystal layer, but not limited thereto. In other embodiments, the display medium layer 150 may be an electro-phoretic layer, an electro-wetting layer or other medium layer of which the optical transmittance can be controlled by electric field applied thereon.

Following the mentioned above, the color filter 140 is disposed on the active device array substrate 130, and the color filter 140 includes a substrate 141 and a yellowish photoresist 142 disposed between the substrate 141 and the active device array substrate 130, preferred, the yellowish photoresist 142 disposed on the substrate 141, but not limited it. The yellowish photoresist 142 includes a first fluorescent material 142a. More specifically, the color filter 140 also includes a red photoresist 143, a green photoresist 144 and a blue photoresist 145 disposed on the substrate 141. The photoresist having different colors are separated by black matrix 147 which has shading effect to light. In other words, in the color filter 140 of this embodiment, a pixel unit 146 includes at least four colors, preferred, is composed of a red photoresist 143, a green photoresist 144, a blue photoresist 145, and a yellowish photoresist 142. And the color filter 140 includes a plurality of pixel units 146 (only one pixel unit 146 is shown in FIG. 1 for illustration).

The display panel 100 is, but not limited to, a reflective display panel, a transmissive display panel or a transflective display panel. No matter where the light is incident into the display panel 100, the light passes through the display medium layer 150 and the color filter 140 sequentially and then exits the display panel 100 eventually.

In this embodiment, the display panel 100 is, for example, a transmissive display panel. Light needed for displaying images is provided by, for example, a backlight module 110.

When a light L provided by the backlight module 110 passes through the yellowish photoresist 142, the first fluorescent material 142a of the yellowish photoresist 142 absorbs a part of the light L of wavelength between about 600 nm and about 800 nm. That makes the optical transmittance in the optical transmitted spectrum of the yellowish photoresist 142 corresponding to the wavelength between about 600 nm and about 800 nm is substantially greater than 1. More specifically, the spectrum of the light L provided by the backlight module 110 has, for example, one peak corresponding to a wavelength between about 430 nm and about 470 nm and another one peak corresponding to a wavelength between about 530 nm and about 570 nm.

Figure 2:
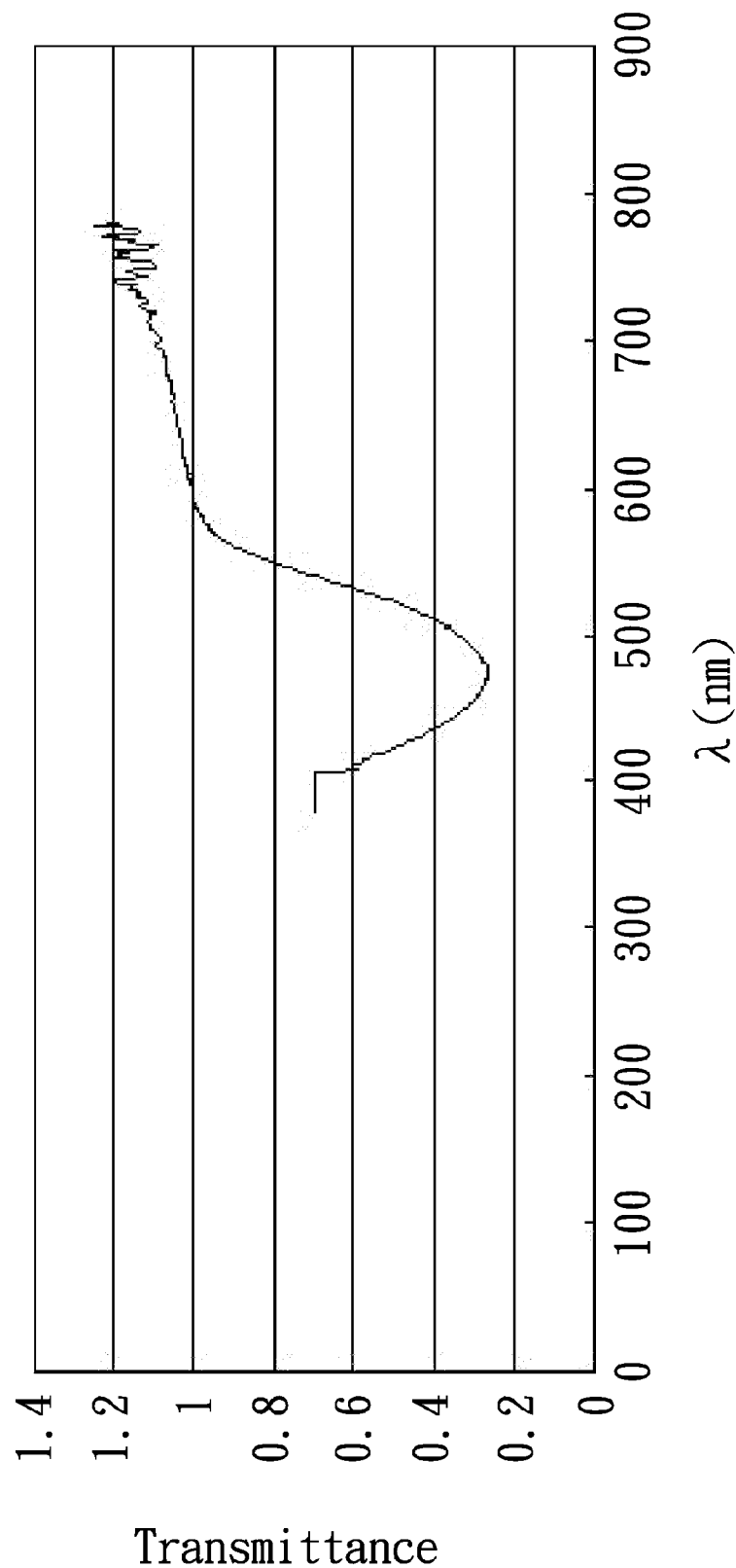
FIG. 2 is a spectrum diagram of the first fluorescent material according to an embodiment of the disclosure.

The characteristics of the first fluorescent material are detailed described below. FIG. 2 is a spectrum diagram of the first fluorescent material according to an embodiment of the disclosure. Referring to FIG. 1 and FIG. 2, the first fluorescent material 142a is adapted to absorb light of wavelength between about 400 nm and about 550 nm, and emitting light of wavelength between about 600 nm and about 800 nm through energy transformation. The optical transmittance in the optical transmitted spectrum of the yellowish photoresist 142 corresponding to the wavelength between about 600 nm and about 800 nm is increased to be substantially greater than 1. In this embodiment, the luminescence spectrum $b(\lambda)$ of the first fluorescent material 142a satisfies a polynomial equation of the form:

$$b(\lambda)=A\lambda^6+B\lambda^5+C\lambda^4+D\lambda^3+E\lambda^2+F\lambda+G,$$

where $-6\times10^{-14}<A<-4\times10^{-14}$, $10\times10^{-10}<B<3\times10^{-10}$, $-3\times10^{-7}<C<-10^{-7}$, $0.0001<D<0.0003$, $-0.08<E<-0.07$, $15<F<17$ and $-1470<G<-1460$.

Figure 3:
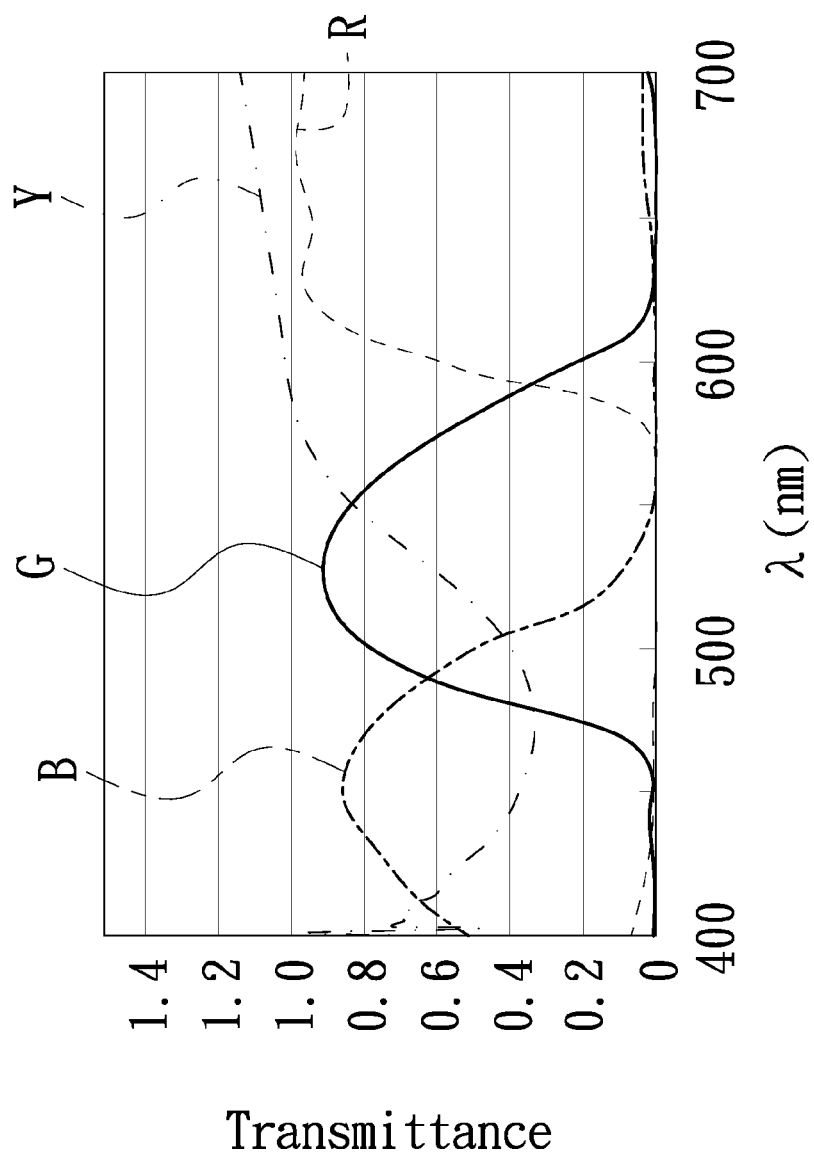
FIG. 3 is a spectrum showing optical transmittances of different photoresists according to an embodiment of the disclosure.

FIG. 3 is a spectrum showing optical transmittances of different photoresists according to an embodiment of the disclosure. The optical transmittance R of the red photoresist, the optical transmittance G of the green photoresist and the optical transmittance B of the blue photoresist are all smaller than 1 within the wavelength range from about 400 nm to about 700 nm. Only the optical transmittance Y of the yellowish photoresist is substantially greater than 1 within the wavelength is substantially greater than 600 nm.

Figure 4:
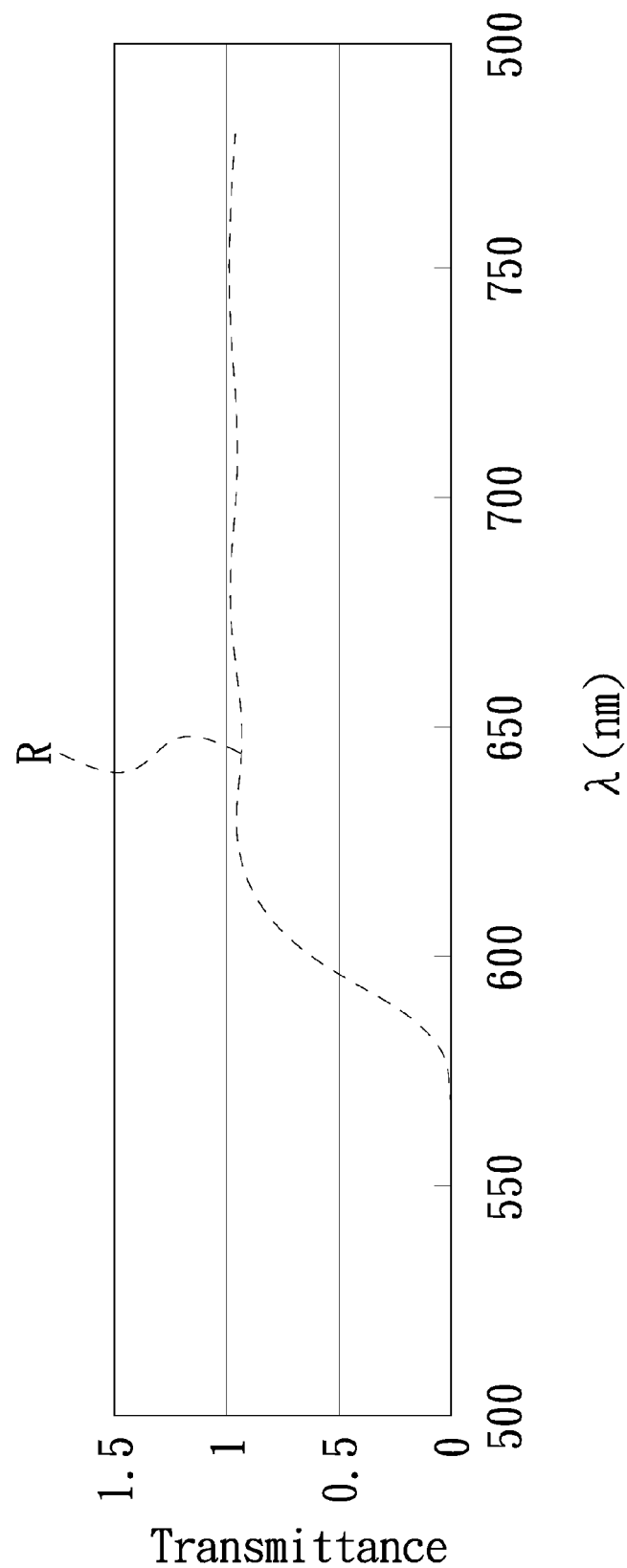
FIG. 4 is a spectrum showing the optical transmittance R of red photoresist in FIG. 3.
Figure 5:
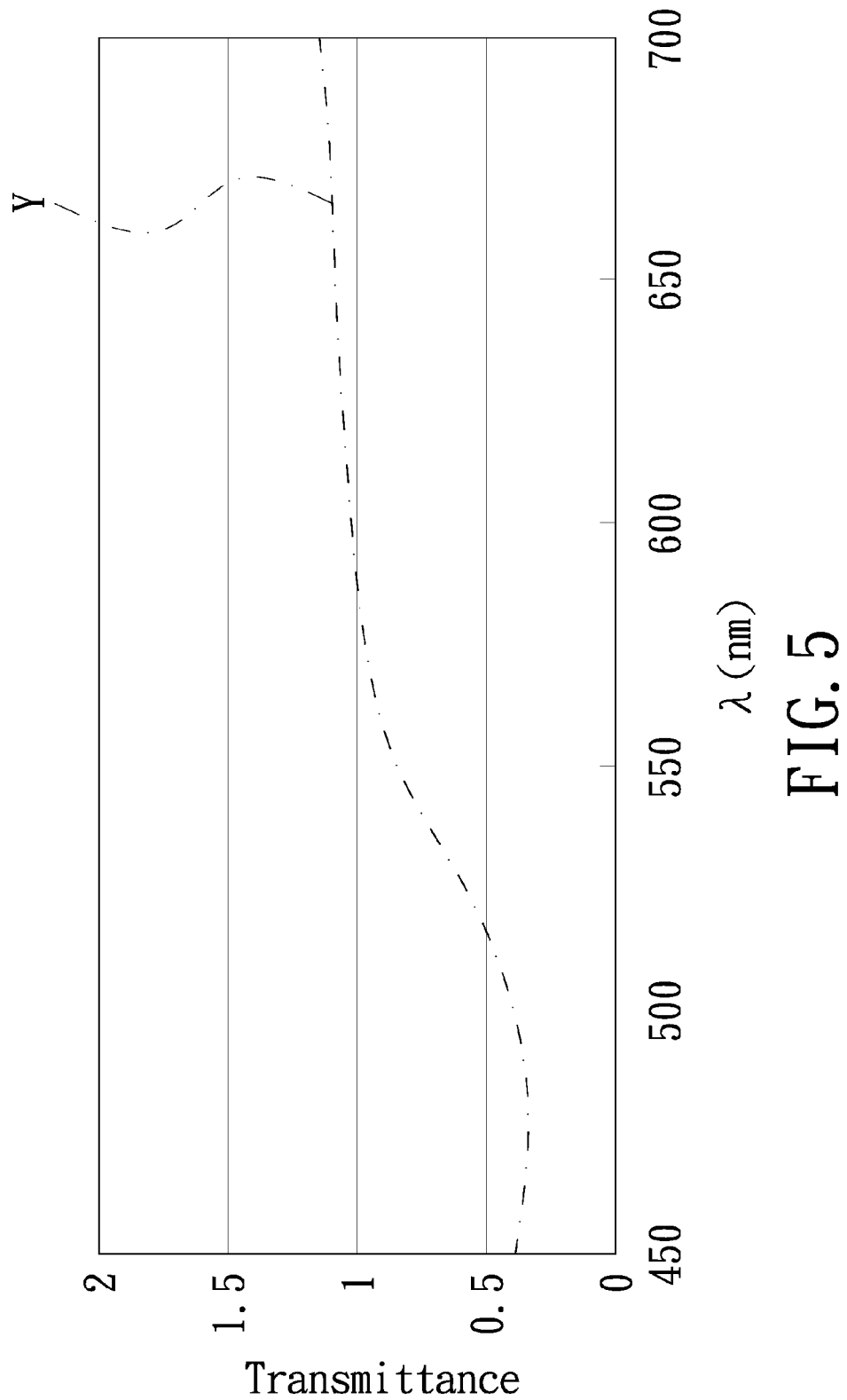
FIG. 5 is a spectrum showing the optical transmittance Y of red photoresist in FIG. 3.
Figure 6:
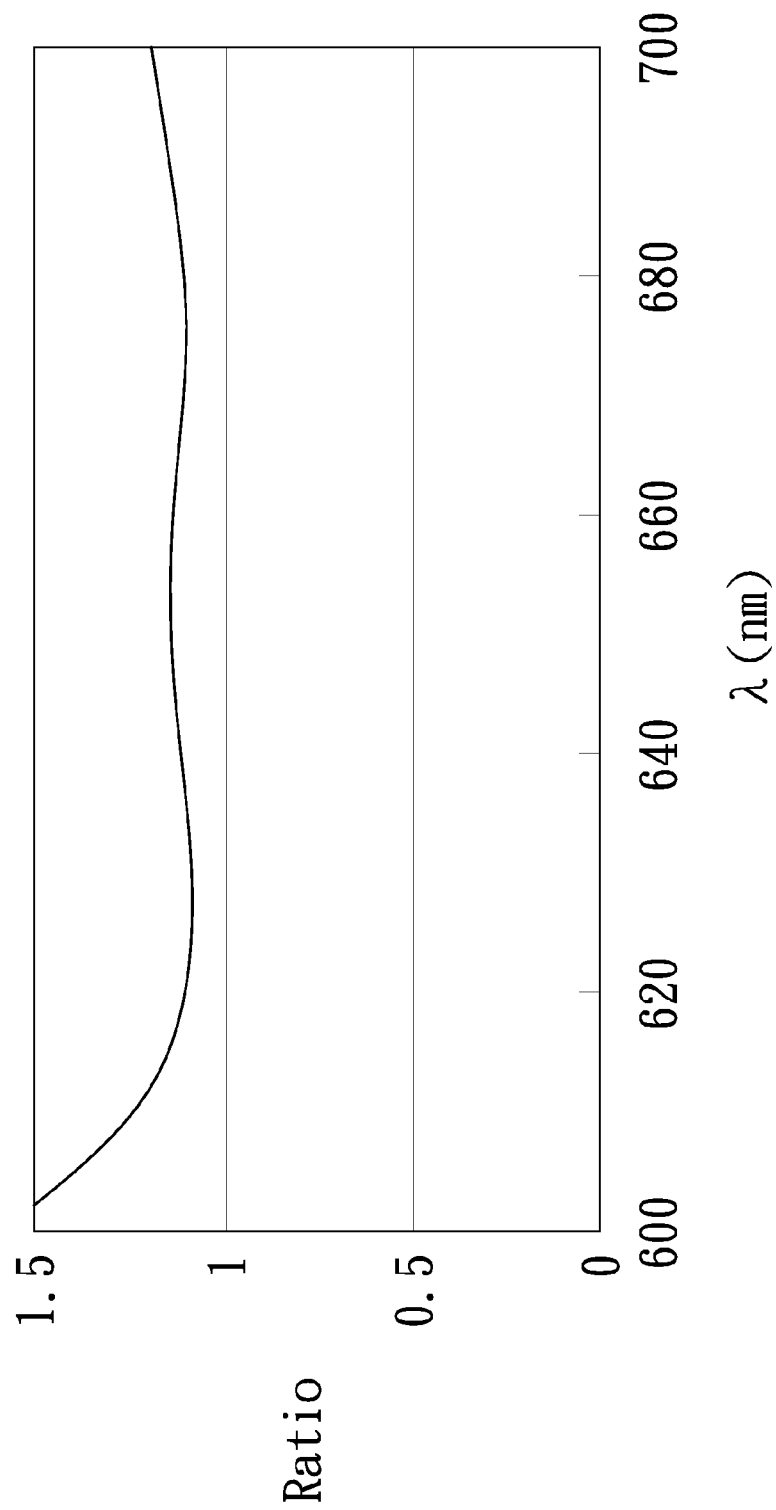
FIG. 6 is a ratio spectrum showing the ratio of the optical transmittance Y of yellowish photoresist to the optical transmittance R of the red photoresist.

Below, the optical transmittance R of the red photoresist is compared with the optical transmittance Y of the yellowish photoresist. FIG. 4 is a spectrum showing the optical transmittance R of red photoresist in FIG. 3. As can be seen, the optical transmittance R of the red photoresist is in the range from about 0.85 to about 0.99 within the wavelength range between about 600 nm to about 650 nm. FIG. 5 is a spectrum showing the optical transmittance Y of red photoresist in FIG. 3. As can be seen, the optical transmittance Y of the yellowish photoresist is in the range from about 1 to about 1.5 within the wavelength range from about 600 nm to about 650 nm. FIG. 6 is a ratio spectrum showing the ratio of the optical transmittance Y of yellowish photoresist to the optical transmittance R of the red photoresist. As can be seen, the ratio Q of the optical transmittance Y of yellowish photoresist to the optical transmittance R of the red photoresist is in the range from about 1.1 to about 2 within the wavelength range from about 600 nm to about 650 nm.

Numerical data are listed below for further demonstrating the chromaticity of the light passing through the color filter 140 of the embodiment. It should be noted that the numerical data listed below is not intended to limit the disclosure.

In this embodiment, the color of the light passing through the red photoresist 143 of the color filter 140 is represented as an x-coordinate value (Rx) and a y-coordinate value (Ry) in chromaticity diagram published by International Commission on Illumination (CIE) in 1931 satisfying in equations: 0.625<Rx<0.655 and 0.315<Ry<0.335, respectively. The color of the light passing through the green photoresist 144 is represented as an x-coordinate value (Gx) and a y-coordinate value (Gy) in the mentioned chromaticity diagram satisfying inequations: 0.285<Gx<0.295 and 0.597<Gy<0.599, respectively. The color of the light passing through the blue photoresist 145 is represented as an x-coordinate value (Bx) and a y-coordinate value (By) in the mentioned chromaticity diagram satisfying inequations: 0.145<Bx<0.155 and 0.055<By<0.065, respectively. The color of the light passing through the yellowish photoresist 142 is represented as an x-coordinate value (Yx) and a y-coordinate value (Yy) in the mentioned chromaticity diagram satisfying inequations: 0.410<Yx<0.420 and 0.420<Yy<0.430, respectively. And the color of a white light mixed by the lights with different colors passing through the color filter 140 is represented as an x-coordinate value (Wx) and a y-coordinate value (Wy) in the mentioned chromaticity diagram satisfying inequations: 0.285<Wx<0.295 and 0.290<Wy<0.300, respectively. In comparison to the conventional color filter without using fluorescent material, the optical transmittance of the color filter 140 in this embodiment is increased by 8 percents.

In other embodiment, the composition of the first fluorescent material 142a of the color filter 140 can be slightly different from that of the above embodiment, and the luminescence spectrum $b(\lambda)$ of the first fluorescent material 142a is slightly different from the polynomial equation of the above embodiment. More specifically, if a photoresist including a second fluorescent material is defined as a reference photoresist, and the luminescence spectrum $a(\lambda)$ of the second fluorescent material satisfies a polynomial equation of the form:

$$a(\lambda)=A\lambda^6+B\lambda^5+C\lambda^4+D\lambda^3+E\lambda^2+F\lambda+G,$$

where $-6\times10^{-14}<A<-4\times10^{-14}$, $10\times10^{-10}<B<3\times10^{-10}$, $-3\times10^{-7}<C<-10^{-7}$, $0.0001<D<0.0003$, $-0.08<E<-0.07$, $15<F<17$ and $-1470<G<-1460$.

Further, the optical transmittance spectrum $A(\lambda)$ of the reference photoresist is calculated by: $A(\lambda)=\int_0^\infty a(\lambda)c(\lambda)d\lambda$, the optical transmittance spectrum $B(\lambda)$ of the yellowish photoresist 142 is calculated by: $B(\lambda)=\int_0^\infty b(\lambda)c(\lambda)d\lambda$, and the $c(\lambda)$ is the luminescence spectrum of the standard illuminant published by International Commission on Illumination (CIE) in 1931, therefore the ratio of the $B(\lambda)$ to the $A(\lambda)$ is greater than about 75%. That is, the optical transmittance spectrum $B(\lambda)$ of the yellowish photoresist 142 has an upper tolerance limitation of about 25%.

At least one of the red photoresist 143, the green photoresist 144 and the blue photoresist 145 may include a third fluorescent material having similar capabilities as the first fluorescent material 142a. The difference is that the third fluorescent material has a composition different from that of the first fluorescent material 142a and thus has different light absorption band and light emission band. In other words, the person having ordinary skill in the art can select the composition of the third fluorescent material according to practical requirements, which makes the third fluorescent material have a proper light absorption band and a light emission band.

In conclusion, the color filter of the disclosure adopts the yellowish photoresist including fluorescent material for absorbing light of longer wavelength band, so that the optical transmittance in the optical transmitted spectrum of the yellowish photoresist corresponding to the wavelength between about 600 nm and about 800 nm is substantially greater than 1. Consequently, not only the color gamut of the display panel using the color filter is expanded, the color saturation and the brightness of the images displayed by the display panel are improved as well.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color filter, comprising:
   a substrate; and
   a yellowish photoresist disposed on the substrate, wherein the yellowish photoresist comprising a first fluorescent material, and the optical transmittance in the optical transmitted spectrum of the yellowish photoresist corresponding to the wavelength between 600 nm and 800 nm is greater than 1,
   wherein the luminescence spectrum $b(\lambda)$ of the first fluorescent material satisfies a polynomial equation of the form:

$$b(\lambda)=A\lambda^6+B\lambda^5+C\lambda^4+D\lambda^3+E\lambda^2+F\lambda+G,$$

where $-6\times10^{-14}<A<-4\times10^{-14}$, $10\times10^{-10}<B<3\times10^{-10}$, $-3\times10^{-7}<C<-10^{-7}$, $0.0001<D<0.0003$, $-0.08<E<-0.07$, $15<F<17$, $-1470<G<-1460$.

2. The color filter according to claim 1, wherein the first fluorescent material is adapted for absorbing visible light of wavelength between 400 nm and 550 nm and emitting light of wavelength between 600 nm and 800 nm.

3. The color filter according to claim 1, wherein the ratio of the optical transmittance spectrum $B(\lambda)$ of the yellowish photoresist to the optical transmittance spectrum $A(\lambda)$ of a reference photoresist is greater than 75%, the reference photoresist comprises a second fluorescent material having a luminescence spectrum $a(\lambda)$ satisfying a polynomial equation of the form:

$$a(\lambda)=A\lambda^6+B\lambda^5+C\lambda^4+D\lambda^3+E\lambda^2+F\lambda+G,$$

where $-6\times10^{-14}<A<-4\times10^{-14}$, $10\times10^{-10}<B<3\times10^{-10}$, $-3\times10^{-7}<C<-10^{-7}$, $0.0001<D<0.0003$, $-0.08<E<-0.07$, $15<F<17$ and $-1470<G<-1460$, the optical transmittance $B(\lambda)$ of the yellowish photoresist is calculated by: $B(\lambda)=\int_0^\infty b(\lambda)c(\lambda)d\lambda$, the optical transmittance $A(\lambda)$ of the reference photoresist is calculated by: $A(\lambda)=\int_0^\infty a(\lambda)c(\lambda)d\lambda$, wherein the $b(\lambda)$ is the luminescence spectrum of the first fluorescent material, and $c(\lambda)$ is the luminescence spectrum of the standard illuminant published by International Commission on Illumination (CIE) in 1931.

4. The color filter according to claim 1, further comprising a red photoresist, a green photoresist and a blue photoresist disposed on the substrate, wherein at least one of the red photoresist, the green photoresist and the blue photoresist comprises a third fluorescent material.

5. The color filter according to claim 1, wherein optical transmittance of the red photoresist is in the range from 0.85 to 0.99 within the wavelength range between 600 nm to 650 nm.

6. The color filter according to claim 1, wherein optical transmittance of the yellowish photoresist is in the range from 1 to 1.5 within the wavelength range between 600 nm to 650 nm.

7. The color filter according to claim 1, wherein the ratio of the optical transmittance of yellowish photoresist to the optical transmittance of the red photoresist is in the range from 1.1 to 2 within the wavelength range between 600 nm to 650 nm.

8. A display panel, comprising:
   an active device array substrate;
   a color filter disposed on the active device array substrate and comprising a substrate and a yellowish photoresist disposed between the substrate and the active device array substrate, wherein the yellowish photoresist comprising a first fluorescent material, and the optical transmittance in the optical transmitted spectrum of the yellowish photoresist corresponding to the wavelength between 600 nm and 800 nm is greater than 1; and
   a display medium layer disposed between the active device array substrate and the color filter,
   wherein the luminescence spectrum $b(\lambda)$ of the first fluorescent material satisfies a polynomial equation of the form:

$$b(\lambda)=A\lambda^6+B\lambda^5+C\lambda^4+D\lambda^3+E\lambda^2+F\lambda+G,$$

where $-6\times10^{-14}<A<-4\times10^{-14}$, $10\times10^{-10}<B<3\times10^{-10}$, $-3\times10^{-7}<C<-10^{-7}$, $0.0001<D<0.0003$, $-0.08<E<-0.07$, $15<F<17$, $-1470<G<-1460$.

9. The display panel according to claim 8, wherein the first fluorescent material is adapted for absorbing visible light of wavelength between 400 nm and 550 nm and emitting light of wavelength between 600 nm and 800 nm.

10. The display panel according to claim 8, wherein the ratio of the optical transmittance spectrum $B(\lambda)$ of the yellowish photoresist to the optical transmittance spectrum $A(\lambda)$ of a reference photoresist is greater than 75%, wherein the reference photoresist comprises a second fluorescent material having a luminescence spectrum $a(\lambda)$ satisfying a polynomial equation of the form:

$$a(\lambda)=A\lambda^6+B\lambda^5+C\lambda^4+D\lambda^3+E\lambda^2+F\lambda+G,$$

where $-6\times10^{-14}<A<-4\times10^{-14}$, $10\times10^{-10}<B<3\times10^{-10}$, $-3\times10^{-7}<C<-10^{-7}$, $0.0001<D<0.0003$, $-0.08<E<-0.07$, $15<F<17$ and $-1470<G<-1460$, wherein the optical transmittance $B(\lambda)$ of the yellowish photoresist is calculated by: $B(\lambda)=\int_0^\infty b(\lambda)c(\lambda)d\lambda$, the optical transmittance $A(\lambda)$ of the reference photoresist is calculated by: $A(\lambda)=\int_0^\infty a(\lambda)c(\lambda)d\lambda$, wherein the $b(\lambda)$ is the luminescence spectrum of the first fluorescent material, and $c(\lambda)$ is the luminescence spectrum of the standard illuminant published by International Commission on Illumination (CIE) in 1931.

11. The display panel according to claim 8, wherein the color filter further comprises a red photoresist, a green photoresist and a blue photoresist disposed on the substrate, wherein at least one of the red photoresist, the green photoresist and the blue photoresist comprises a third fluorescent material.

12. The display panel according to claim 8, wherein the ratio of the optical transmittance of yellowish photoresist to the optical transmittance of the red photoresist is in the range from 1.1 to 2 within the wavelength range between 600 nm to 650 nm.

13. The display panel according to claim 8, wherein optical transmittance of the red photoresist is in the range from 0.85 to 0.99 within the wavelength range between 600 nm to 650 nm.

14. The display panel according to claim 8, wherein optical transmittance of the yellowish photoresist is in the range from 1 to 1.5 within the wavelength range between 600 nm to 650 nm.

15. The color filter according to claim 1, wherein the first fluorescent material is adapted for absorbing light having a first peak corresponding to a wavelength between 430 nm and 470 nm and a second peak corresponding to a wavelength between 530 nm and 570 nm.

16. The color filter according to claim 1, wherein the first fluorescent material is adapted for absorbing light of wavelength more than 400 nm and less than or equal to 550 nm and emitting light of wavelength between 600 nm and 800 nm.

17. The display panel according to claim 8, wherein the first fluorescent material is adapted for absorbing light having a first peak corresponding to a wavelength between 430 nm and 470 nm and a second peak corresponding to a wavelength between 530 nm and 570 nm.

18. The display panel according to claim 8, wherein the first fluorescent material is adapted for absorbing light of wavelength more than 400 nm and less than or equal to 550 nm and emitting light of wavelength between 600 nm and 800 nm.

* * * * *